United States Patent [19]
LaConte

[11] Patent Number: 5,680,680
[45] Date of Patent: Oct. 28, 1997

[54] REMOVABLE MULTIFUNCTIONAL AIRCRAFT CLIP

[75] Inventor: Richard J. LaConte, Kent, Wash.

[73] Assignee: The Boeing Company, Seattle, Wash.

[21] Appl. No.: 582,833

[22] Filed: Jan. 2, 1996

[51] Int. Cl.⁶ .............................. A44B 21/00; E04F 19/00
[52] U.S. Cl. .................. 24/295; 24/297; 24/513; 24/543
[58] Field of Search .......................... 24/295, 293, 297, 24/530, 511, 543, 336, 513, 30.5 P; 411/511, 522

[56] References Cited

U.S. PATENT DOCUMENTS

| | | | |
|---|---|---|---|
| 1,377,116 | 5/1921 | Delcourt | 24/513 |
| 2,986,793 | 6/1961 | Bright | 24/295 |
| 3,766,925 | 10/1973 | Rubricius | 24/543 |
| 3,767,092 | 10/1973 | Garrison et al. . | |
| 4,352,476 | 10/1982 | Meeks | 24/535 |
| 4,669,156 | 6/1987 | Guido et al. | 24/297 |
| 4,701,983 | 10/1987 | Warmath . | |
| 4,724,651 | 2/1988 | Fligg . | |
| 5,075,935 | 12/1991 | Abdi | 24/511 |
| 5,149,569 | 9/1992 | McCue | 24/297 |

FOREIGN PATENT DOCUMENTS

| | | | |
|---|---|---|---|
| 0593927 | 3/1960 | Canada | 24/295 |
| 1336715 | 7/1963 | France | 24/297 |
| 0848665 | 9/1960 | United Kingdom | 24/295 |

*Primary Examiner*—Victor N. Sakran
*Attorney, Agent, or Firm*—Bernard A. Donahue

[57] ABSTRACT

Disclosed is an aircraft clip for attaching insulation blankets and other nonstructual items, such as wire bundles and hydraulic conduits, to structural members. The clip has a molded plastic shaped base and a "T" shaped grip rotatably connected to the base. The grip is rotated to secure the nonstructural item by a "C" shaped clamp which is pushed into a detent to assure that the clip is locked. The "T" shaped grip is allowed to rotate by a flexible and thin tab interconnecting the base and "T" shaped grip which, in a preferred embodiment, are integrally molded. Optionally, the "C" shaped clamp may be made of spring steel rather than molded of plastic. Also optionally, the "T" shaped grip may be allowed to rotate into position by a metal hinge pin.

5 Claims, 2 Drawing Sheets

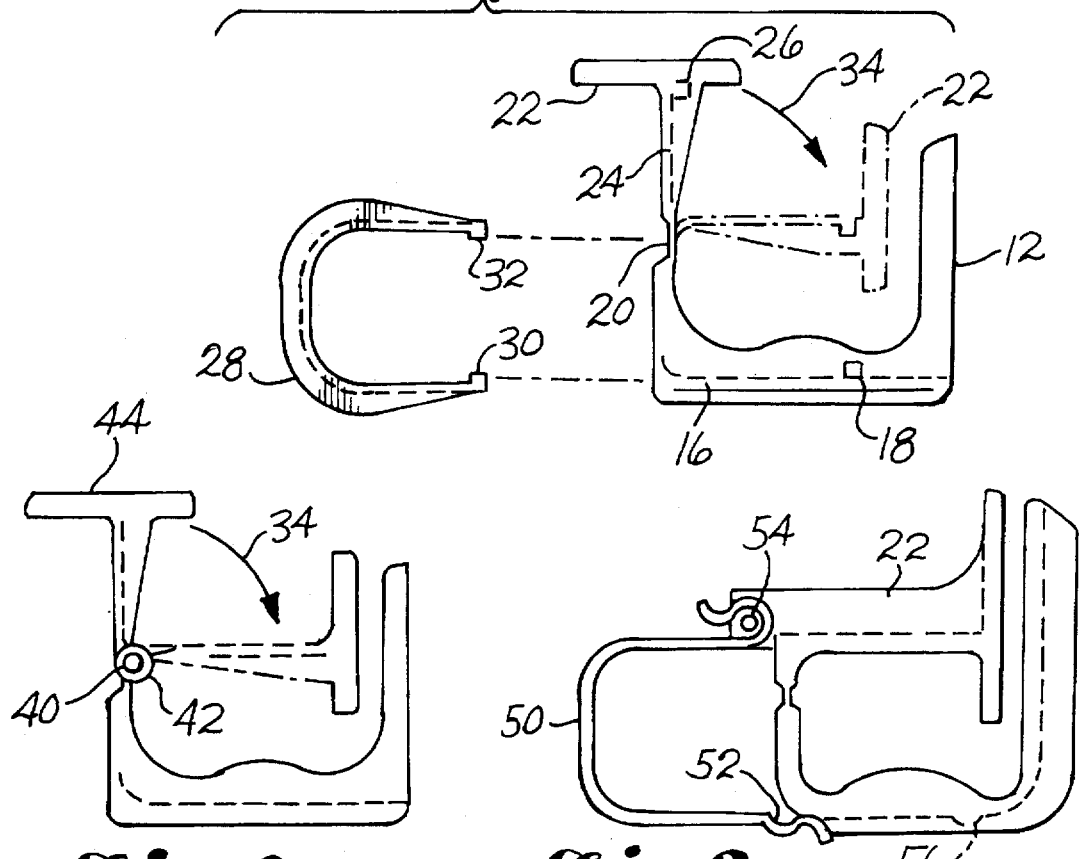
Fig.1
Fig.2
Fig.3
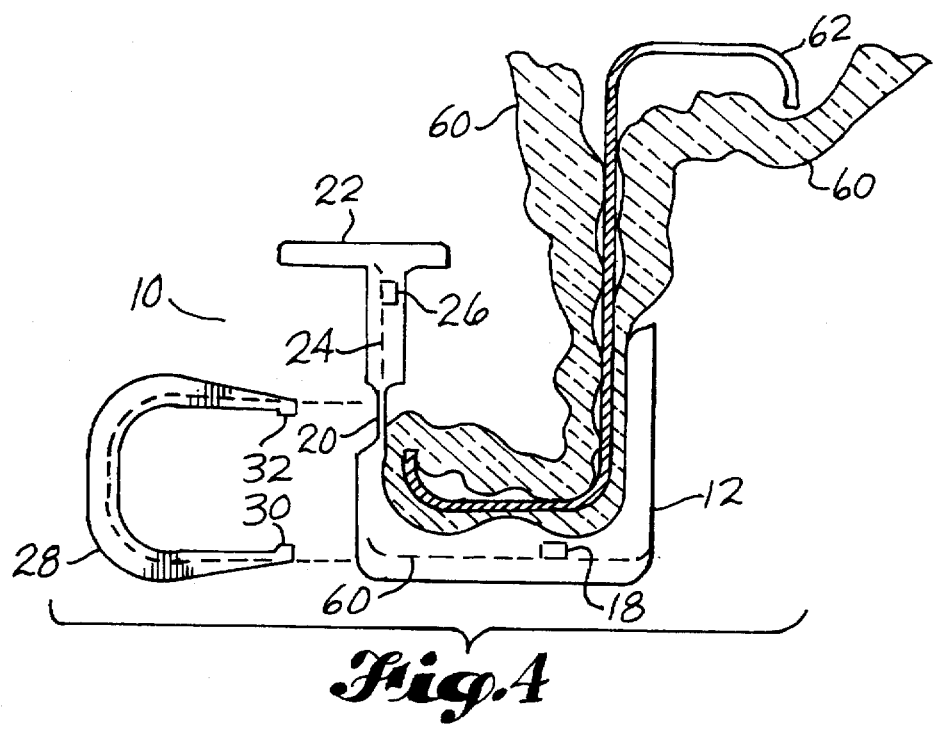
Fig.4

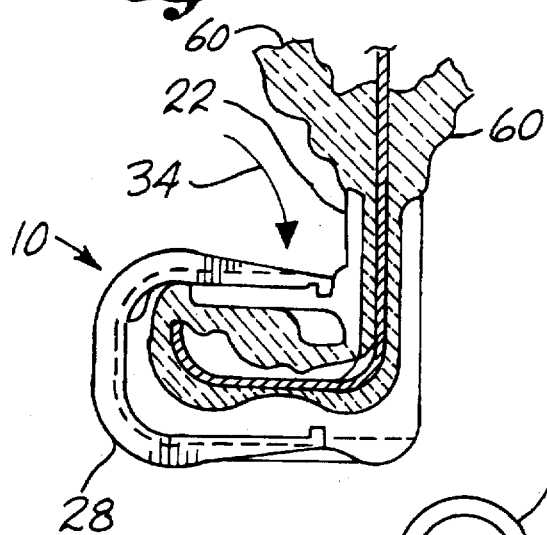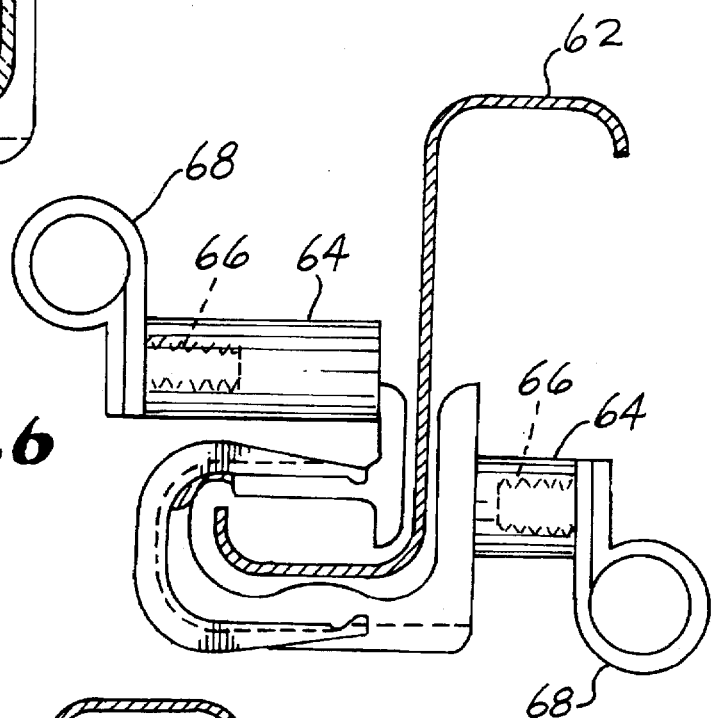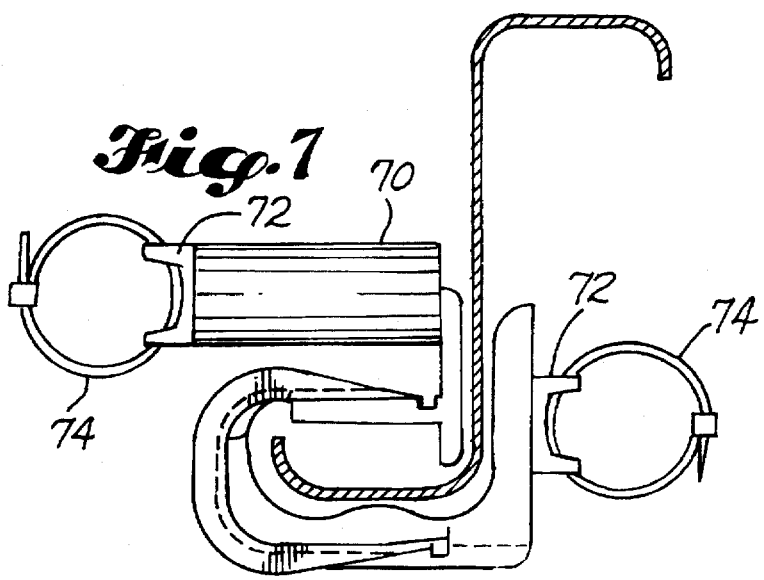

5,680,680

REMOVABLE MULTIFUNCTIONAL AIRCRAFT CLIP

FIELD OF THE INVENTION

This invention relates generally to a device for attaching nonstructural elements to structural members and, more particularly, to clips for attaching insulation blankets, wire bundles and the like to aircraft frames.

BACKGROUND OF THE INVENTION

In the aircraft industry, the elongated and very long structual members that are attached to fuselage skins are known as stringers. The generally circular round or elipsoidal members that are attached to the fuselage stringers are known as frames and are spaced apart a little less than two feet. Both stringers and frames are known to be useful for attaching and supporting nonstructual items such as wire bundles, hydraulic lines, and air conditioning conduits.

At one time, it was not an uncommon practice to drill holes through, and otherwise penetrate or scratch the frames and stringers in order to install clips for attachment thereto. This practice, however, has largely been discontinued because such penetration causes removal of protective coatings, increased stress and stress corosion around the penetrated area of the frame or stringer.

Another problem has been in the attachment and support of aircraft fuselage insulation blankets. One practice has been to utilize hemispherical end fasteners with pins that have pointed ends and closely spaced conical shapes for engagment with the holes in the fasteners. In this situation, the pins are passed through the insulation blankets in order to hold the insulation blankets in place. This often leads to tearing of the cover of the blanket, accumulation of moisture and water within the blanket, and, in time, significant aircraft weight and corrosion problems.

The U.S. Pat. No. 5,352,078 to Nasu, assigned to the assignee of this invention, describes several embodiments of airplane stringer clips for attaching wire bundles and the like to stringers. However, neither the prior art embodiments shown in Nasu, or those shown in other prior art known to applicant, anticipate the features of this invention.

Because a modern airplane requires hundreds of clips of the type described here, it is essential such clips are easy to install and remove without damaging the nonstructural elements that are being supported. It is also important that once the clips are installed, they remain in place when subjected to various vibrational and other forces which an airplane encounters.

SUMMARY OF THE INVENTION

The aircraft clip of this invention is secured to a structural member and supports nonstructural items such as insulation blankets and wire bundles in an aircraft. In a preferred embodiment, the clip has a molded plastic "J" shaped base, a rotatable "T" shaped grip connected to the base that is rotated by the installer's hand to grip the nonstructural item, and a generally "C" shaped stamped or machined aluminum to grip and lock the "T" shaped part against inadvertent release of the nonstructural item. The "T" shaped part may be integrally molded with the base and allowed to rotate by a flexible and thin tab interconnecting the base and the "T" shaped part and acting as a hinge. Optionally, the "T" shaped part may rotate about a pin in a boss formed in the base. Also, the "C" shaped clamp may be formed of spring steel.

BRIEF DESCRIPTION OF THE DRAWINGS

FIG. 1 is a side elevation view of a two part version of the clip of this invention.

FIG. 2 is a side elevation view of a three part version of the clip.

FIG. 3 a side elevation view of an optional "C" clamp made of a spring steel band rather than aluminum.

FIG. 4 a side elevation cutaway view of an insulation blanket loaded into position for locking in the clip.

FIG. 5 is a cutaway elevation view of the placement of parts after rotation of the "T" shaped part and locking of the clamp to grip an insulation blanket.

FIG. 6 is a cutaway elevation view illustrating the attachment of p-clamps to the clip.

FIG. 7 illustrates the attachment of wire bundle clamps to the clip of this invention.

DESCRIPTION OF THE PREFERRED EMBODIMENTS

FIG. 1 shows a two part clip 10 made according to this invention. A "J" shaped base is preferrably molded from a Dupont Zytel 101 plastic material. The "J" shaped base 12 is provided with a locking groove 16, a detent 18, a thin and flexible hinge portion 20, a rotatable "T" shaped grip 22, a locking groove 24, and a detent 26.

A retainer "C" shaped clamp 28, stamped from aluminum, is provided with a lug 30 and a lug 32. As suggested by the arrow 34, the "T" shaped grip 22 may be rotated by the installer's hand, clockwise, into the horizontal dotted line position shown in FIG. 1. Once in that position, the retainer "C" clamp 28 may be installed into the two locking grooves 16 and 24 and, with light hand pressure, the clamp 28 will be advanced to the right until the lugs 30 and 32 are seated in the detents 18 and 26 and the clip is locked in a gripping position.

FIG. 2 shows an option to the flexible hinge portion 20. A conventional hinge pin 40 may be installed in a boss 42 molded into the base 12. The "T" shaped grip 22 would then be replaced by a separate "T" shaped member 44 that is hingedly attached allowing rotation to the horizontal when acted upon by the "C" clamp grip 28, as discussed in connection with FIG. 1.

FIG. 3 illustrates an option for the "C" clamp grip 28. A "C" shaped spring steel band clamp 50 is shaped to perform the same function as the clamp grip 28, and also is conveniently suitable for attachment to a pin mounted on "T" shaped grip 22, so that the clamp 50 will not become accidently separated or lost from the other parts of the clip 10. Additionally, the lugs 30 and 32 and the detents 18 and 26 will not be needed because the plastic mold may easily be modified to provide a "ridge" on the upper surface of the locking groove 16 to act together with a "valley" 52 formed in the clamp 50 to provide a detent mechanism to lock the clamp 50 in place.

FIG. 4 shows a cutaway view of an insulation blanket 60 in the clip 10. The insulation blanket is in place along the vertical web of the Z section frame member 62, and around the lower flange and back up the vertical web, then on to another clip. As mentioned earlier, frames are spaced apart by a little less than two feet, and normally a clip would be attached at each frame for purposes of supporting an item like an insulation blanket. The clip 10 shown in FIG. 4 is unlocked, but is ready to install on the frame.

FIG. 5 shows the clip 10 of FIG. 4 wherein the clip 10 has been locked by rotating the "T" shaped grip 22 and pushing the clamp 28 into position to secure the insulation blanket.

FIG. 6 shows a clip 10 installation that includes integrally molded standoffs 64 having threaded bushings 66. The bushings 66 have either been installed in the "J" shaped base mold or are installed by an ultrasonic process after molding. In any event, the threaded bushings 66 have been used for attachment of P-clamps 68 to carry conduits, wire bundles and the like. The clip 10 is shown to be in a configuration to carry insulation blankets {not shown} and like items.

FIG. 7 also shows the clip to be in a mode to carry insulation blankets {not shown} along with a standoff 70, two tabs 72, and two wire ties 74. As can be seen in these FIGURES, the clip 10 is useful to carry not only insulation blankets and the like materials but also is useful to carry conduits, wire bundles and the like.

It will be recognized by persons skilled in this art that various modifications may be made in the preferred embodiments without departing from the spirit and scope of this invention as defined by the appended claims.

The embodiments of the invention in which an exclusive property or privilege is claimed are as follows:

1. An aircraft clip apparatus for attachment of nonstructural items such as insulation blankets and wire bundles, to structural members, such as frames and stringers comprising:

a generally "J" shaped base molded from plastic and having a hinge portion leading to a generally "T" shaped rotatable grip portion;

said base having a locking groove;

a generally "C" shaped clamp, made of steel and having means for applying a gripping force to said structural members to secure said clip to said structural members, wherein said gripping force also serves to secure said nonstructural items upon engagement of said clamp into said locking groove:

said locking groove being equipped with means for preventing inadvertent movement comprising a ridge formed in the upper surface of said locking groove, that rests in a valley formed in said clamp in order to act as a detent to prevent inadvertent movement;

an upstanding integrally molded cylindrical standoff having a threaded bushing located inside of said standoff for attachment of p-clamps which secure and carry wire bundles and the like;

wherein a retaining device is provided that attaches said "T" shaped rotatable grip portion and said "C" clamp to prevent separation or loss of the clamp from the other parts of the clip.

2. The apparatus of claim 1 wherein said retaining device comprises a looped end on said clamp and pin through the flanges of said "T" shaped rotatable grip portion.

3. The apparatus of claim 1 wherein said hinge portion comprises a pinned hinge.

4. The apparatus of claim 1 wherein said hinge portion is molded and is thin and flexible.

5. The apparatus of claim 1 wherein said hinge portion is an integrally molded pinned hinge.

* * * * *